United States Patent [19]

Sartorius

[11] 3,921,452
[45] Nov. 25, 1975

[54] CONTINUOUS TEMPERATURE MEASURING SYSTEM FOR METALLURGICAL FURNACES

[75] Inventor: Guy Sartorius, Ban-Saint-Martin, France

[73] Assignee: Societe des Aciers Fins de l'Est, Boulogne-Billancourt, France

[22] Filed: June 12, 1973

[21] Appl. No.: 369,356

[30] Foreign Application Priority Data
June 16, 1972 France .......................... 72.21944

[52] U.S. Cl. ................................. 73/343.5; 73/359
[51] Int. Cl.² ........................ G01K 1/14; G01K 7/04
[58] Field of Search ............ 73/343 R, 359, 343.5; 136/231–235

[56] References Cited
UNITED STATES PATENTS

| | | | |
|---|---|---|---|
| 2,576,514 | 11/1951 | Bianco et al. | 136/234 X |
| 2,971,041 | 2/1961 | France | 73/343 R X |
| 3,090,233 | 5/1963 | Shields et al. | 73/343 R |
| 3,217,543 | 11/1965 | Van Haagen | 73/359 X |
| 3,635,087 | 1/1972 | Conklin | 73/343.5 |
| 3,647,560 | 3/1972 | Truppe et al. | 73/359 X |
| 3,717,034 | 2/1973 | Dukelow et al. | 73/343 R |
| 3,763,704 | 10/1973 | Blau et al. | 73/359 |

Primary Examiner—Richard C. Queisser
Assistant Examiner—Frederick Shoon

[57] ABSTRACT

A system for continuously measuring the temperature of the walls of a metallurgical furnace employs a thermocouple positioned in an elongated hollow measuring rod mounted for reciprocal movement in an aperture in the furnace wall from an extended position projecting through the wall into the interior of the furnace to a withdrawn position in which the hot end of the thermocouple is located within the furnace wall. Cyclic reciprocating movement is imparted to the rod by a double acting fluid motor. A servo mechanism controlled by a temperature recorder is provided to withdraw the rod in response to temperature readings measured by the thermocouple to thereby prevent overexposure of the rod to the intense heat, and means are provided for withdrawing the rod periodically to compensate for furnace wall errosion. Controlled cooling may be provided to preserve the life of the thermocouple, with the measured temperature influenced by the controlled cooling being an indication of the actual temperature.

8 Claims, 3 Drawing Figures

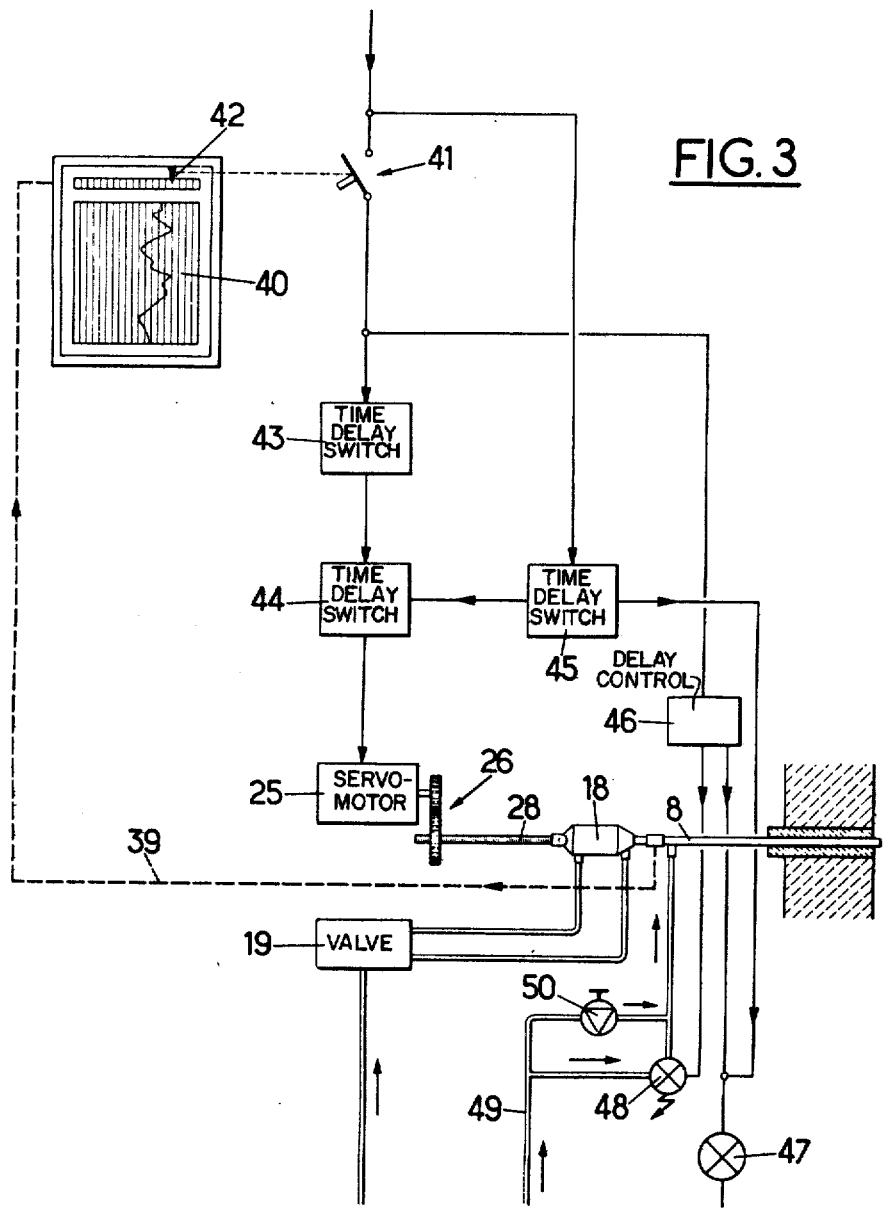

CONTINUOUS TEMPERATURE MEASURING SYSTEM FOR METALLURGICAL FURNACES

BACKGROUND OF THE INVENTION

This invention relates to a system for continuously measuring temperature variations in a chamber intended for the melting of metals. A system of this kind is applied in metallurgical furnaces, blast furnaces, converters, cupola furnaces and so on.

In metallurgy, and particularly steel production, temperature control is frequently required using pick-up elements in the form of probes which usually comprise thermocouples. To obtain correct temperature measurement, the thermocouples must pass through the lining covering the inner walls of the furnace and other chambers of the same type. Such linings, which vary according to the operation carried out, always have relatively considerable wear in view of their continual contact with the bath of molten metal and the difficult conditions to which they are subjected.

In present day steelworks are furnaces, a number of skips of scrap are introduced successively into the furnace and are melted in a suitable operating cycle. The electric arc develops by using maximum power and forming a trench in the scrap as far as the furnace walls. In such an arc furnace it will be apparent that the walls may be attacked by the arc developed by the electrodes and as an example, dolomite walls of a thickness of 450 mm undergo an average of 20 to 60 mm wear per day and have to be partially changed after one week and completely replaced at the end of two weeks of use.

It should be noted that in all cases the walls of such chambers undergo wear due to their own melting and are also continuously subjected to liquid steel and slag spatter during the refining operation.

It will therefore be apparent that a probe enabling temperature to be measured inside a furnace must withstand wall surface temperatures of as much as 1,700°C.

In addition, the probe must not be influenced as regards its measurements, or damaged, by the products due to the melting of the furnace walls, nor by spatter from the molten bath of metal.

SUMMARY OF THE INVENTION

This invention proposes to provide a system for continuously measuring the temperature variations of such a chamber intended for melting metals, by means of a probe adapted to be displaceable in accordance with the wear on the chamber walls so that it will not itself melt and will not project unduly to the interior of the chamber where it is likely to be destroyed by the scrap introduced into the chamber. The invention also relates to a probe from which the slag is automatically removed during its operation.

Finally, the invention also relates to the application of such a probe to a method of determining and supervising the thickness of the walls of a chamber or of a metallurgical furnace.

To this end, the system for the continuous measurement of the temperature variations of a chamber intended for the melting of metals according to the invention is of the type comprising a shielded thermocouple disposed in a measuring rod and comprises first displacement means for a translatory reciprocating movement of the measuring rod so that on an advance movement its end penetrates the interior of the chamber and on a withdrawal movement its end returns to a suitable recess formed in the chamber wall. In this way, the removal of slag from the internal orifice of the recess is produced by the movement of the rod itself.

The system also comprises second displacement means for a predetermined withdrawal of the measuring rod when the measured temperature exceeds a predetermined value for a predetermined period, so as to avoid damage to the thermocouple. According to the invention, the first and second said means are adapted to be able to act simultaneously.

The measuring rod comprises a hollow casing so as to be able to cool the hot end of the thermocouple by means of a flow of a suitable fluid inside the casing, the fluid preferably being low-pressure compressed air.

In one embodiment, the periphery of the casing at the end adjacent the hot end of the thermocouple is formed with outlet orifices for the cooling fluid so as to cool the molten slag clogging the probe passage orifice and render it brittle. Such cooling also enables the probe to withstand mechanical impacts and prevent molten steel or slag spatter from lodging thereon.

In another embodiment, the measuring rod consists of a hollow casing inside which a coaxial tube is mounted, the entry orifice for the cooling fluid to the casing and the exit orifice from the hollow tube both being situated at the casing end remote from the thermocouple hot end.

The thermocouple hot end is welded in a nipple formed from stainless stell or refractory steel and is connected to the end of the measuring rod.

In a preferred embodiment of the system according to the invention, the reciprocatory movement of the measuring rod is produced by means of a jack connected to a control fluid distributor valve controlled by a time switch so as to give an automatic movement cycle for the rod and a predetermined displacement thereof. The control fluid may advantageously be compressed air at the network pressure.

In one embodiment of the invention, the automatic withdrawal movement of the measuring rod is produced by means of a screw spindle connected to the rear end of the measuring rod and the said jack. The screw spindle is driven via a servo mechanism which may, for example, be an electric servomotor controlled by a temperature recorder such as an electronic pyropotentiometer connected to the thermocouple.

According to the invention, the servo mechanism may be controlled by the temperature recorder by means of a first time switch which prevents the servo mechanism from operating in the event of the period during which predetermined limit temperature is exceeded being too short. A second time switch disposed in the control circuit at the servo mechanism input determines the value of the withdrawal of the measuring rod, which is preferably selected so as to be equal, at maximum, to half the travel of the reciprocating movement of the measuring rod.

If the measured temperature does not drop after a new predetermined period, a delay safety device can feed the rod casing with compressed air at the network pressure. The same applies in the event of breakage of the thermocouple which, by means of a conventional recorder arrangement, causes the recorder to rise to its maximum value.

The system according to the invention also comprises a third daily time switch which produces a predetermined withdrawal of the measuring rod to allow for the daily wear of the walls of the chamber or metallurgical furnace.

In one embodiment of the system according to the invention, a wall thickness measuring system may be provided, since the measuring rod withdrawal is a function of said thickness. Such a system may, for example, comprise just a fixed graduated scale from which it is possible to read off the wall thickness variation.

BRIEF DESCRIPTION OF THE DRAWINGS

The invention will be more readily understood from one embodiment of a system for measuring temperature variations in a metallurgical furnace described by way of non-limitative example of the invention and illustrated in the drawings wherein:

FIG. 3 is a functional diagram of the automatic measuring rod withdrawal control according to the invention.

DESCRIPTION OF THE PREFERRED EMBODIMENTS

Figure 1:
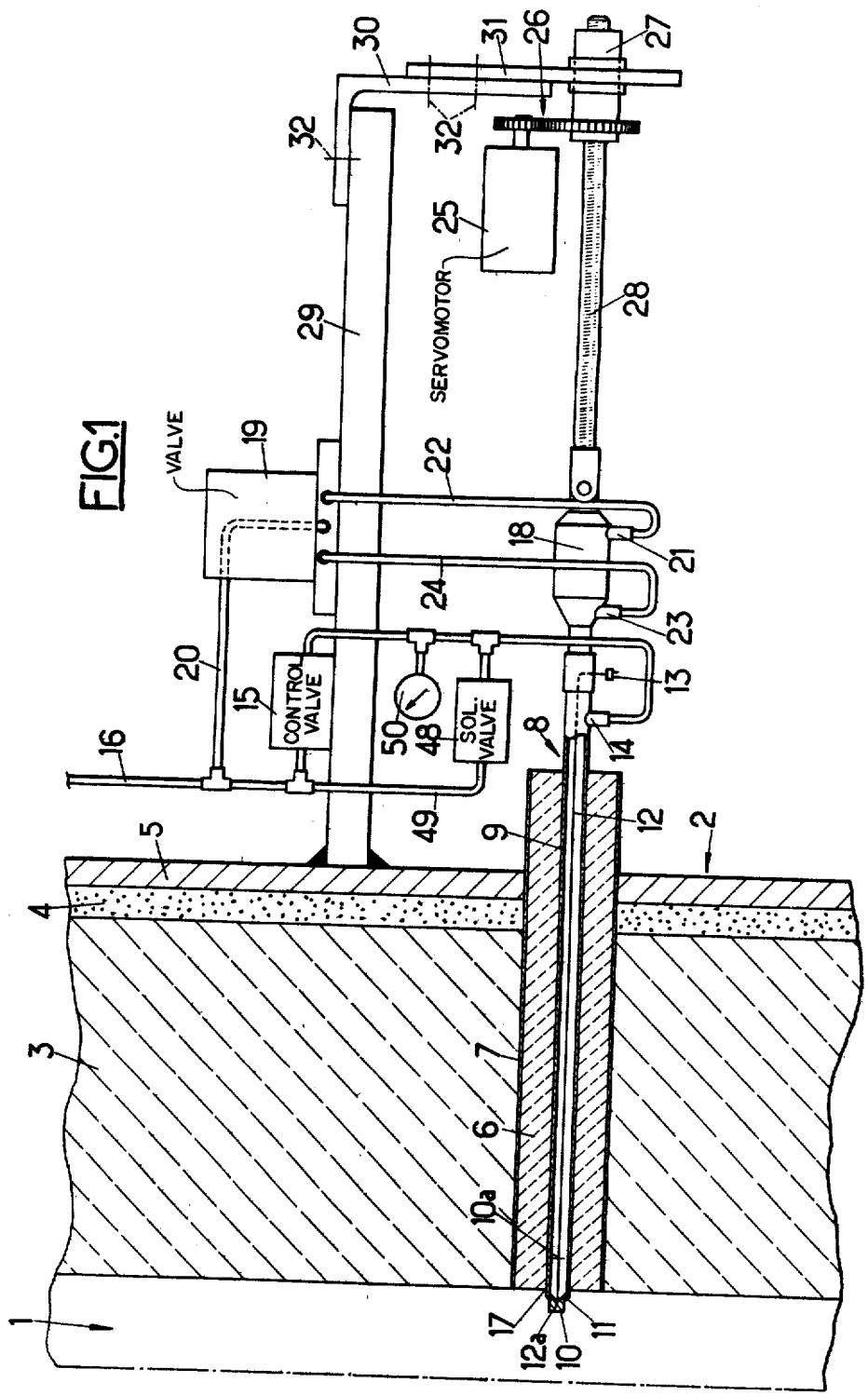
FIG. 1 diagrammatically shows the mechanical part of a first embodiment of the system according to the invention.

Referring to FIG. 1, a metallurgical furnace has a chamber 1 with inner walls 2 formed by a layer of dolomite 3, an insulating lining 4 and a steel outer wall 5. A tube or refractory material 6 externally sheathed in a steel wall 7 extends throughout the wall 2. Sheathing by means of a steel outer tube 7 ensures mechanical stability of the tube 6 during charging of the furnace 1 and electromagnetic stability if the furnace in question is an arc furnace.

The tube 6 is disposed in a prefabricated orifice formed in the blocks which make up the wall 2 and its shielding, at a suitable height.

A measuring rod 8 comprises a hollow casing 9 inside which is welded a nipple 10 formed with peripheral perforations 11. A jacketed thermocouple 12 has its hot end 12a welded in the nipple 10, with the thermocouple leads being disposed inside the hollow casing 9, the output voltage or measuring voltage which represents the temperature value being taken from the output terminals 13 of the thermocouple 12.

The thermocouple 12 may advantageously be a shielded thermocouple of the conventional Chromel-Alumel type, the two conductors being embedded inside an insulated sheath within the hollow center of casing 9. The casing 9 and the nipple 10 may be made of stainless steel or refractory steel.

According to the invention, near its end remote from the hot end 12a of the thermocouple, the casing 9 has an entry orifice 14 for low-pressure compressed air from a control valve 15 which is fed with compressed air at the network pressure via the pipe line 16 and connected to the orifice 14 through the pressure reducer 50. The supply of low-pressure compressed air thus results in cooling of the nipple 10 and the hot end 12a of the thermocouple, such cooling being adjustable by means of the valve 15 depending upon the temperature level required for the thermocouple output signal. In this way the temperature variations of the walls are measured, and this is sufficient for most needs. It is possible to obtain an absolute value of the temperature for a given furnace by sacrificing a number of thermocouples embedded in the wall 2.

The low-pressure compressed air entering the hollow casing 9 via the entry orifice 14 leaves via the end orifices 11 in the nipple 10, so that the molten slag of the wall 2 is cooled and rendered brittle. In this way, movement of the rod 8 inside the furnace 1 has the effect of slagging off the internal orifice 17 of the refractory tube 6.

The reciprocating movement of the rod 8 is obtained by means of a double-acting pneumatic cylinder or jack 18 fixed to the end of the rod 8 remote from the nipple 10. An electropneumatic distributor valve 19 is fed with compressed air at the network pressure via the pipe 20 and is controlled by a suitable time switch (not shown in FIG. 1) so as to supply alternately the entry orifice 21 of the jack 18 via the flexible pipe 22 or the entry orifice 23 of the jack 18 via the flexible pipe 24. By the action of electropneumatic distributor 19 the measuring rod 8 penetrates the furnace 1 by a short length adapted to charging of the scrap and as illustrated in FIG. 1, and then enters the probe orifice of the refractory tube 6 over a suitable length as shown by broken line 10a in the drawing.

The system for the automatic withdrawal of the rod 8 comprises a servo mechanism including an electric servomotor 25, the control mechanism of which will be explained hereinafter. The servomotor 25 acts via a gear train 26 on a rotating nut 27, cooperating with a screw spindle 28 which is locked as to rotation and one of the ends of which is connected to the jack 18.

By the action of the servomotor 25 the rod 28 is thus displaced with a translatory movement to the right in FIG. 1, so that the rod 8 is withdrawn inside the refractory tube 6 by means of the jack 18.

A bracket 29 is welded to the metal wall 5 of the furnace and enables the various elements of the system according to the invention to be fixed. By means of adjusting screws 32, slides 30 and 31 enable the measuring rod 8 to be accurately located to allow manual adjustment to the slightly irregular position of the guide tube 6 relatively to the furnace chamber 1 whenever the walls 2 are repaired.

Figure 2:
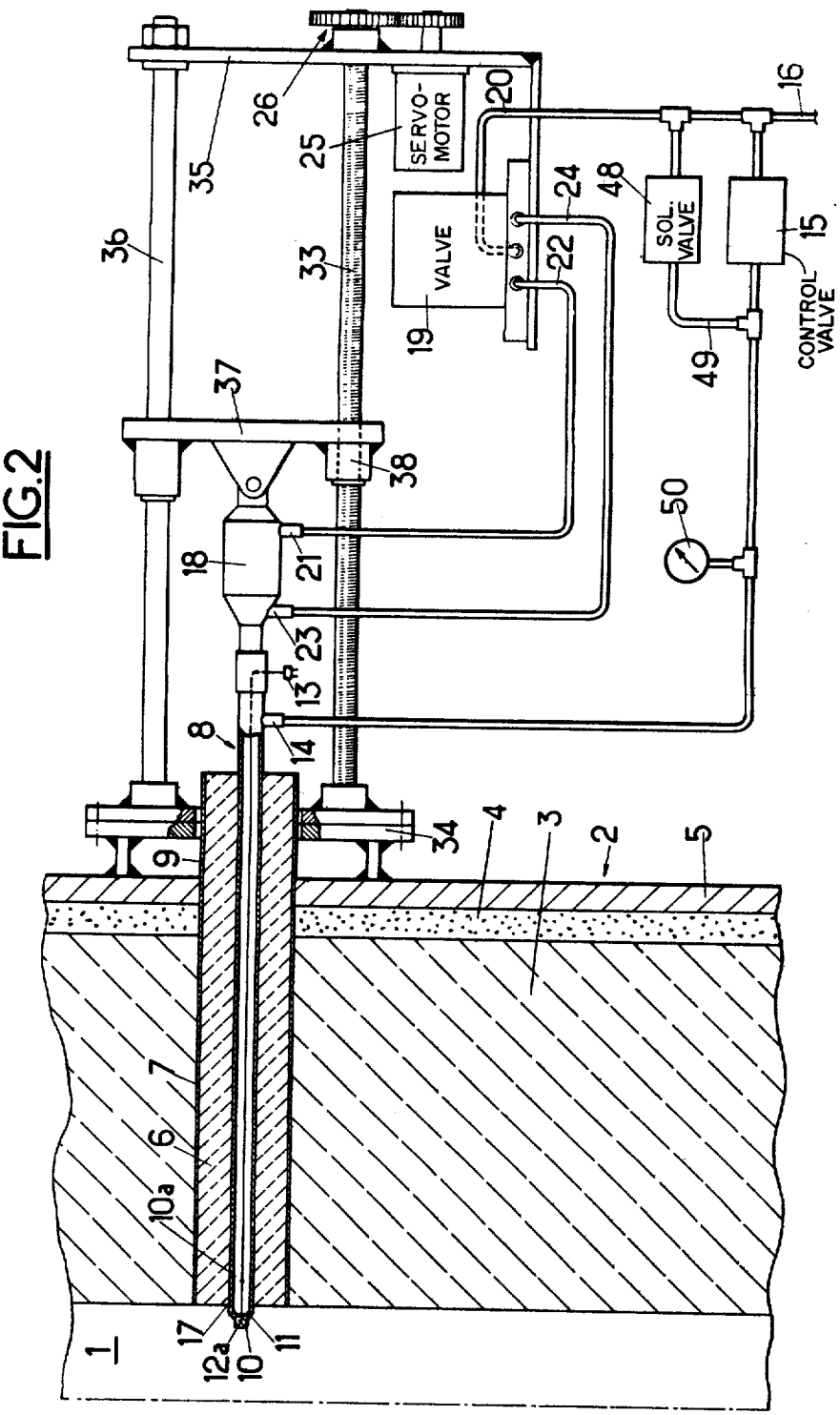
FIG. 2 diagrammatically shows the mechanical part of a second embodiment of the same system.

FIG. 2 illustrates a second embodiment of the system according to the invention, which differs from the first solely in respect of the mechanical production of the translatory movement of the automatic withdrawal system.

Referring to FIG. 2, those elements of the system which are identical to those shown in FIG. 1 have been given the same references. Thus, the servomotor 25 drives a gear train 26 which rotates a screw spindle 33 which is locked in respect of translatory movement between a plate 34 integral with the wall 5 of the furnace and a plate 35 on which the servomotor 25 is mounted.

A guide rod 36 acting as a strut between the plates 34 and 35 also guides a supporting plate 37 which is fixed to the rear end of the jack 18. A nut 38 connected to the supporting plate 37 allows translatory movement of the latter when the screw spindle 32 rotates on itself, thus producing a translatory displacement of the measuring rod 8 in the same way as in the embodiment shown in FIG. 1.

It is, of course, possible to provide the servomotor 25 with two safety limit devices one at the limits of travel toward and away from the furnace and a manual or automatic overriding forward-reverse changeover switch so that the measuring rod can be disposed in the operative position or be completely withdrawn.

A measuring scale could also readily be disposed parallel to the screw spindle 28 or 33 so that an accurate indication of the thickness of the wall 2 and hence the degree of wear thereof could readily be obtained by noting the displacement of a reference mark.

FIG. 3 diagrammatically shows the automatic electrical control system for withdrawal of the measuring rod 8.

The thermocouple 12 disposed inside the rod 8 is electrically connected by the conductor 39 to a temperature recorder 40 which may, for example, be an electronic pyropotentiometer of conventional type provided, in a manner known per se, with a safety cam and a contact 41. A limit temperature 42 can be indicated on the recorder by means of the safety cam.

The electrical circuit broken by the switch 41 contains a first time switch 43 in series with a second time switch 44. A third time switch 45 or a daily time switch is connected in parallel in the electrical circuit between a point situated upstream of the switch 41 and the time switch 44. The output of the time switches 44 and 45 is connected to the electric servomotor 25 which acts on the screw 28 and the measuring rod 8 via the gearing 26. A delay control device 46 is also connected in the circuit in parallel with the time switches 43 and 44 and is actuated via the switch 41. The control element 46 acts on an alarm lamp 47 and also on a solenoid valve 48 which directly feeds the hollow casing 9 of the measuring rod 8 (see FIG. 1) with compressed air at the pressure of the network from the pipe 49 which thus short circuits the normal cooling circuit for the measuring rod 8, which was fed via the pressure reducer 50.

The control system operates as follows:

When the temperature measured by the thermocouple 12 in the measuring rod 8 exceeds the limit temperature 42 on the temperature recorder 40, the switch 41 is closed as a result.

If the temperature is exceeded just for a short predetermined period, the time switch 43 prevents the servomotor 25 from operating and the measuring rod 8 from being withdrawn.

If, on the other hand, the temperature rise exceeds the time set on the time switch 43, the latter actuates the servomotor 25 for a predetermined period which is fixed by the time switch 44, so that the measuring rod 8 is withdrawn over a length equal to half the travel of the jack 18, which during this period continues to drive the measuring rod 8 with a reciprocatory movement.

If, after this withdrawal of the measuring rod 8, the temperature stays at a value higher than the limit temperature 42 for a longer predetermined period, the delay control device 46 triggers the alarm 47 and opens the compressed air supply at the network pressure via the solenoid 48, so hat the measuring rod 8 is vigorously cooled.

If, after 24 hours operation of the metallurgical furnace, the limit temperature has not been exceeded — as may occur on successive pourings at increasingly low temperatures — the measuring rod 8 must nevertheless be withdrawn in view of the normal wear of the furnace walls. This withdrawal is carried out by means of the daily time switch 45 which acts independently of the position of the switch 41 on the electric servomotor 25 via the time switch 44. In this way, the measuring rod 8 withdraws in the same way by a value equal to half the travel of the jack 18.

Also, the daily time switch 45 acts on the alarm lamp 47 so as to enable the operator to check whether there has been an excessive flow of cooling air or excessive withdrawal of the measuring rod.

In the case of three-electrode arc furnaces, the temperature recorder may be a conventional three-track electronic pyropotentiometer provided with three threshold relays enabling the admissible limit temperatures for the various electrodes to be preset.

With the invention, it is possible to provide a temperature probe adapted to withstand very difficult conditions such as occur in metallurgical furnaces such as electric arc furnaces. With the system according to this invention it is possible for very accurate temperature measurements to be carried out, since the measuring rod provides continual and automatic slag removal and is not influenced by the molten products of the walls nor by the bath spatter.

What is claimed is:

1. A system for continuously measuring temperature variations in a chamber employed for melting metals comprising a shielded thermocouple having its hot end disposed in one end of an elongated measuring rod mounted for movement into said chamber through an aperture in a wall there of to obtain the temperature measurement, first driven displacement means connected to said measuring rod and operable to continuously impart longitudinal reciprocating translatory movement thereto to alternately move said rod between an extended position in which said one end of said rod penetrates inside said chamber and a retracted position in which said one end is withdrawn into said wall to remove any slag from the inner end of said aperture, at least one outlet orifice in the end of said tubular casing adjacent said hot end of said thermocouple whereby a cooling fluid is discharged from said casing at a position to cool slag collected on said inner end of said aperture to thereby facilitate removal of the slag by said measuring rod upon movement into said chamber, and second driven displacement means connected to said measuring rod and responsive to the temperature measured by said thermocouple to automatically withdraw said measuring rod a predetermined distance into said wall when said temperature exceeds a predetermined level for a predetermined time, said second driven displacement means including a temperature recorder connected to said thermocouple, a servo-mechanism controlled by said temperature recorder through a first time delay switch and drivingly connected to said measuring rod to produce withdrawal movement of said measuring rod, said first time delay switch being operable to prevent said servo-mechanism from operating until a predetermined temperature is exceeded for a predetermined time.

2. A system for continuously measuring temperature variations in a chamber employed for melting metals comprising a shielded thermocouple having its hot end disposed in one end of an elongated measuring rod mounted for movement into said chamber through an aperture in a wall thereof to obtain the temperature measurement, first driven displacement means connected to said measuring rod and operable to continuously impart longitudinal reciprocating translatory movement thereto to alternately move said rod between an extended position in which said one end of said rod penetrates inside said chamber and a retracted position in which said one end is withdrawn into said wall to remove any slag from the inner end of said aperture, and second driven displacement means connected to said measuring rod and responsive to the temperature measured by said thermocouple to automatically withdraw said measuring rod a predetermined distance into said wall when said temperature exceeds a predetermined level for a predetermined time, said second driven displacement means including a temperature recorder connected to said thermocouple a servo mechanism controlled by said temperature recorder through a first time delay switch and drivingly connected to said measuring rod to produce withdrawal movement of said measuring rod, said first time delay switch being operable to prevent said servo mechanism from operating until a predetermined temperature is exceeded for a predetermined time.

3. A system according to claim 2 characterized in that the extent of withdrawal of said measuring rod by said servo mechanism is controlled by a second time switch operably connected between said first time delay switch and said servo mechanism.

4. A system according to claim 3, wherein said second time switch limits operation of said servo mechanism whereby the withdrawal produced as a result of operation of said first time delay switch is no more than half the travel of the first displacement means.

5. A system according to claim 4 further comprising a delay safety device operably connected to and controlled by said temperature recorder to supply said measuring rod casing with compressed air at the network pressure which is greater than the pressure of cooling air supplied by said means for supplying a controlled supply of cooling fluid.

6. A system according to claim 4 further comprising a third time switch operably connected to said servo mechanism for producing a predetermined withdrawal of the measuring rod after passage of a predetermined time, said third time delay switch being operable independent of the temperature sensed by said thermocouple.

7. A system according to claim 6, wherein said third time switch limits operation of said servo mechanism whereby the withdrawal produced as a result of operation of said third time switch is no more than half the travel of said first displacement means.

8. The system according to claim 4 further comprising a measuring scale disposed parallel to the displacement of the measuring rod whereby said system continuous determination of the thickness of the walls of said chamber.

* * * * *